March 18, 1941.  E. G. ROEHM ET AL  2,235,085
MILLING MACHINE TRANSMISSION AND CONTROL MECHANISM
Filed Nov. 15, 1939  5 Sheets-Sheet 1
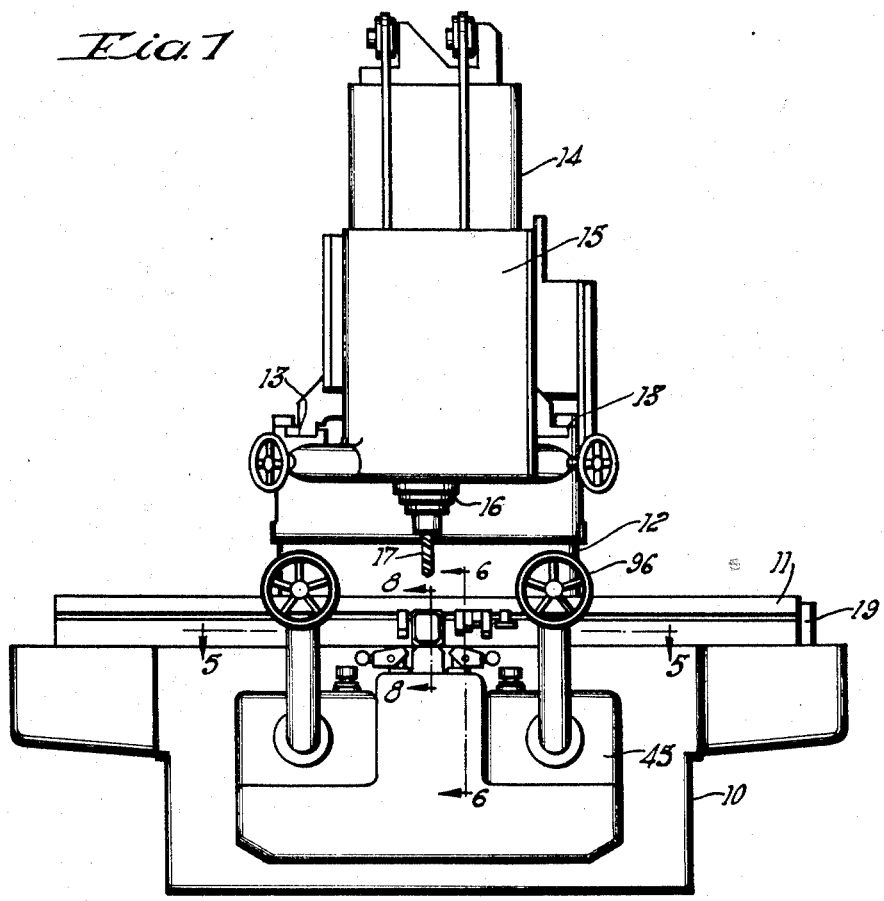
INVENTOR.
ERWIN G. ROEHM
HANS FRITSCHI.
BY
ATTORNEY.

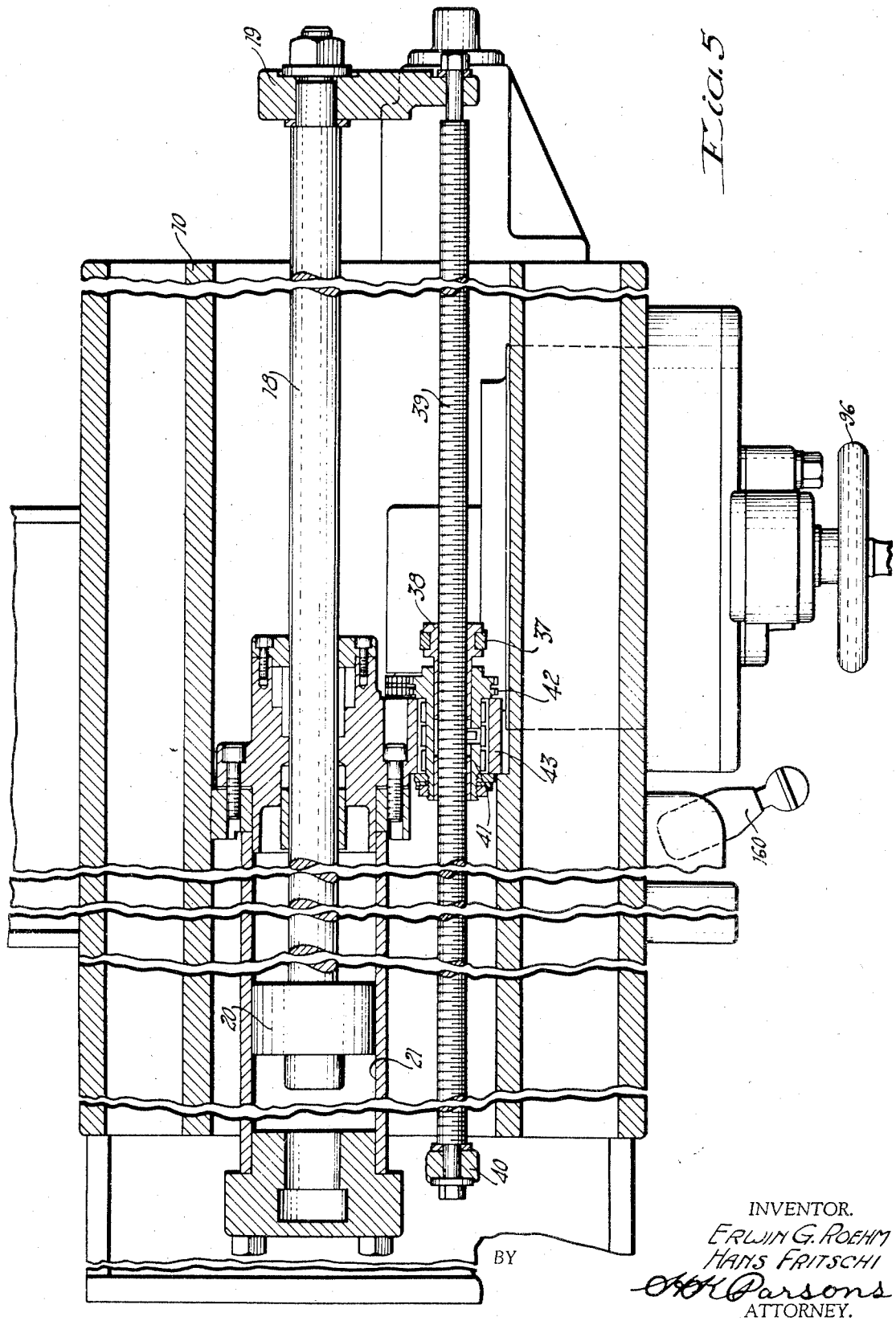

March 18, 1941. E. G. ROEHM ET AL 2,235,085
MILLING MACHINE TRANSMISSION AND CONTROL MECHANISM
Filed Nov. 15, 1939 5 Sheets-Sheet 3
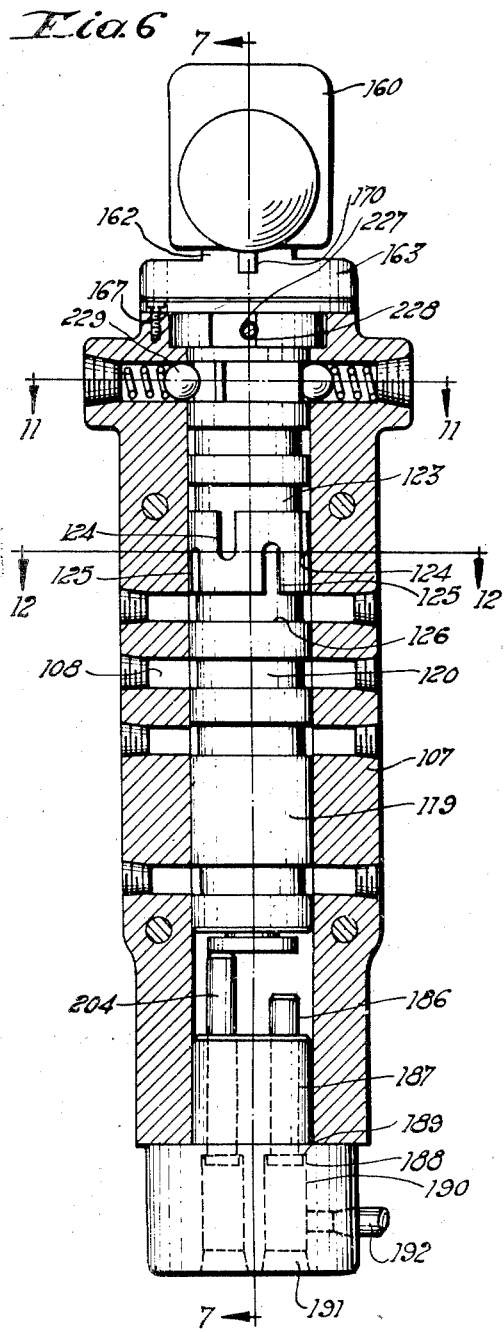
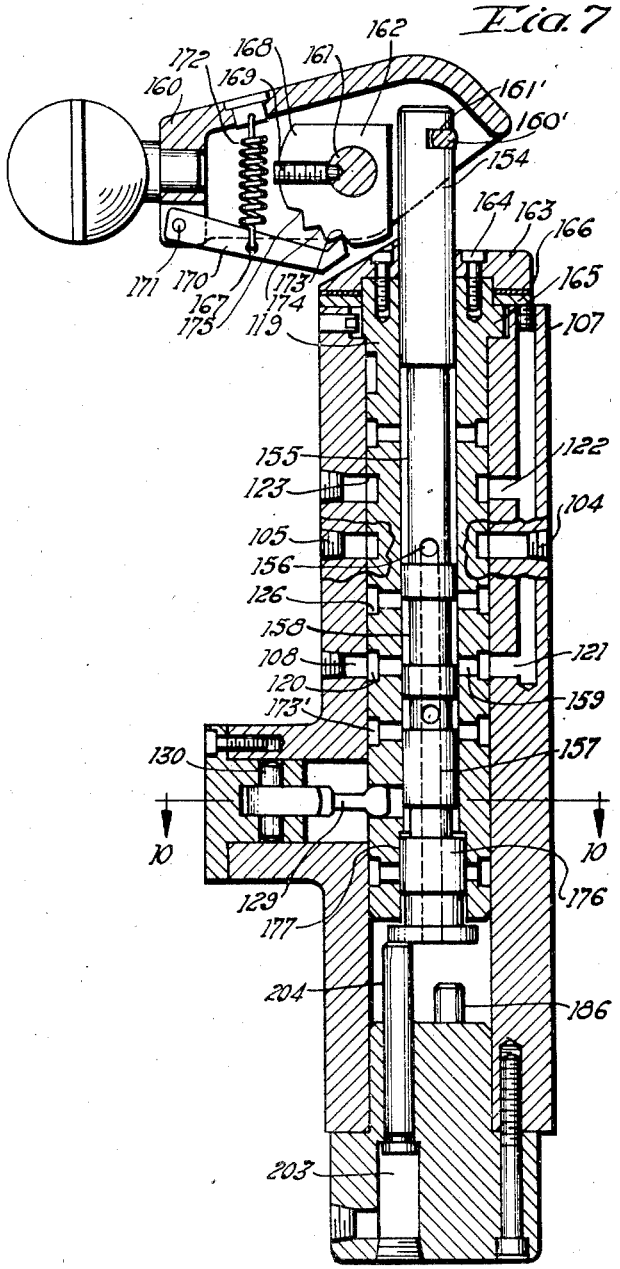
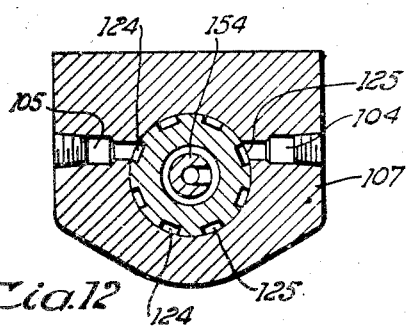
INVENTOR.
ERWIN G. ROEHM
HANS FRITSCHI
BY A.H. Parsons
ATTORNEY.

March 18, 1941.  E. G. ROEHM ET AL  2,235,085
MILLING MACHINE TRANSMISSION AND CONTROL MECHANISM
Filed Nov. 15, 1939  5 Sheets-Sheet 4
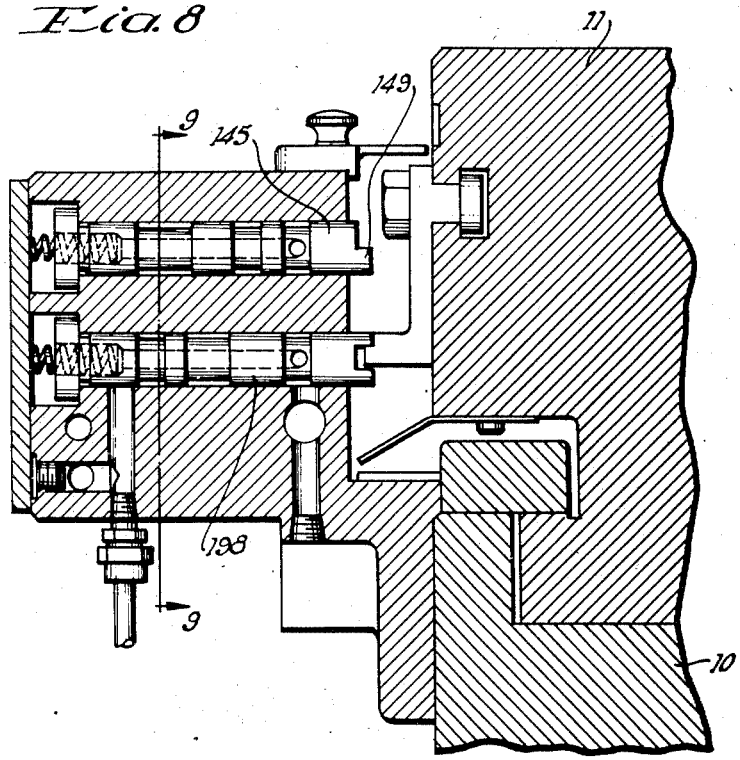
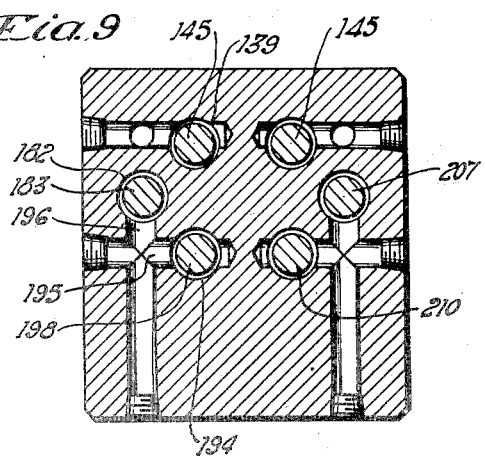
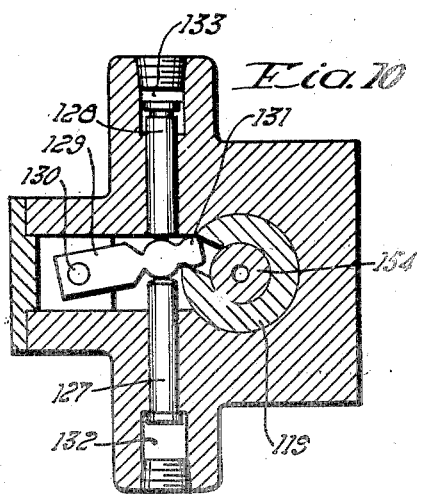
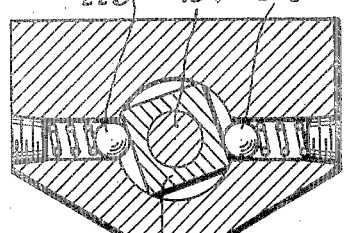
INVENTOR.
ERWIN G. ROEHM
HANS FRITSCHI
BY
H. K. Parsons
ATTORNEY.

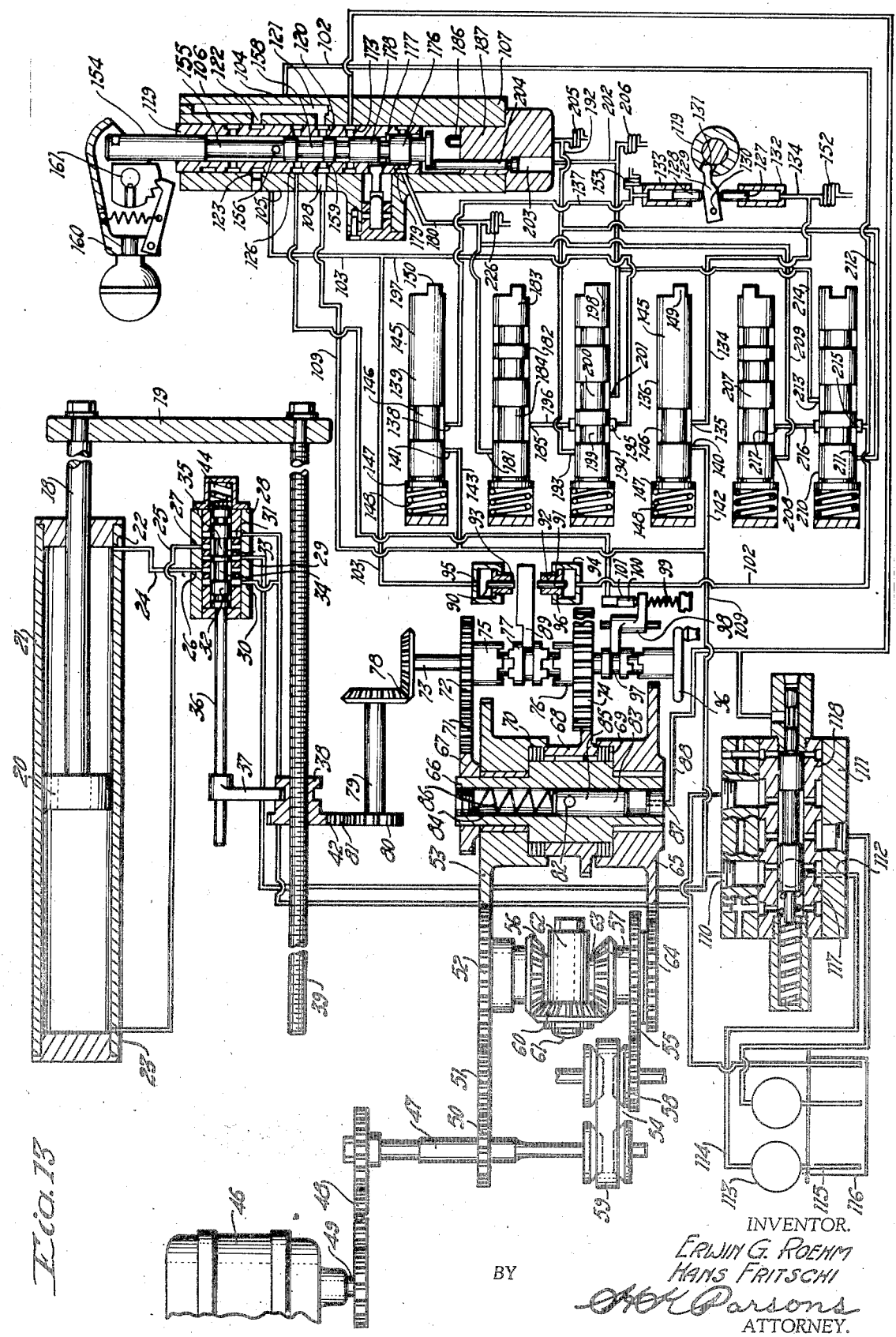

Patented Mar. 18, 1941

2,235,085

UNITED STATES PATENT OFFICE 2,235,085

MILLING MACHINE TRANSMISSION AND CONTROL MECHANISM

Erwin G. Roehm, Norwood, and Hans Fritschi, Silverton, Ohio, assignors to The Cincinnati Milling Machine Co., Cincinnati, Ohio, a corporation of Ohio Application November 15, 1939, Serial No. 304,576

26 Claims. (Cl. 90—21.5)

This invention relates to milling machines and more particularly to improvements in transmission control mechanism therefor.

One of the objects of this invention is to provide an improved transmission control mechanism for a milling machine.

A more specific object of this invention is to provide an improved selector valve mechanism for controlling hydraulic shifting of the rate and direction determining elements of a milling machine transmission.

Another object of this invention is to provide an improved pilot control circuit for remote control of a selector valve.

A further object of this invention is to improve the trip control mechanism and dogging instrumentalities of a milling machine so that latch dogs of any kind are no longer necessary in setting up for even the most complicated cycles.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a milling machine embodying the principles of this invention.

Figure 2 is a diagrammatic view of an illustrative cycle of the machine.

Figure 3 is an elevational view of a dog arrangement to produce the cycle shown in Figure 2.

Figure 4 is a view in plan of the dogs shown in Figure 3.

Figure 5 is a plan view of the table actuating mechanism.

Figure 6 is an enlarged section taken on the line 6—6 of Figure 1 showing the construction of the selector valve sleeve.

Figure 7 is a section on the line 7—7 of Figure 6.

Figure 8 is an enlarged section taken on the line 8—8 of Figure 1.

Figure 9 is a cross section on the line 9—9 of Figure 8.

Figure 10 is a detail section on the line 10—10 of Figure 7.

Figure 11 is a detail section on the line 11—11 of Figure 6.

Figure 12 is a section on the line 12—12 of Figure 6.

Figure 13 is a diagrammatic view of the transmission and control mechanism.

In Figure 1 of the drawings there is shown a milling machine in which is incorporated the mechanism of this invention. In this figure, the reference numeral 10 indicates the machine bed upon top of which is formed guideways for receiving a horizontally movable work table 11. To the rear of the bed 10 arises a column 12 upon top of which is formed guideways 13 for receiving and supporting a ram 14 which is movable in a horizontal plane toward and from the work table 11. The ram supports a vertically movable carrier 15 in which is journaled a cutter spindle 16 for rotating a cutter indicated by the numeral 17.

The table 11 is actuated by a servo-motor mechanism shown more particularly in Figure 5, the motor being of the piston and cylinder type comprising a piston rod 18 which is connected at one end to the apron 19, depending from one end of the table 11. A piston 20 is connected to the other end of the piston rod and slides in a cylinder 21 which is supported on the bed of the machine.

Referring to Figure 13, the ports 22 and 23 located in opposite ends of the cylinder 21 are connected by channels 24 and 25 respectively to ports 26 and 27 of servo-valve 28. This valve also has a central pressure port 29 and a pair of exhaust ports 30 and 31. The servo-valve plunger 32 has a central spool 33 which normally closes the pressure port 29, and a pair of annular grooves 34 and 35 located on opposite sides of the central spool.

The valve plunger has an operating rod 36 which is connected by a fork 37 to a nut 38 threaded on the servo feed-back screw 39.

As shown in Figure 5, the screw is anchored at opposite ends to aprons 19 and 40 which depend from the under side of the table whereby the screw moves with the table. The nut 38, besides being threaded on the screw, has a splined connection with the elongated hub 41 of sprocket wheel 42. The sprocket wheel is fixed against axial movement relative to the housing 43 in which it is rotatably mounted. It will thus be noted that upon rotation of the sprocket, the nut 38 will be rotated, and due to its threaded connection with the screw 39, the nut will move longitudinally of the screw and relative to the sprocket 42, thereby shifting the valve plunger 32 and connecting the pressure port 29 with one of ports 25, 26, causing movement of the piston 20. The remaining port will, of course, be connected to one of the reservoir ports 30—31. A spring 44 is introduced between the end of the servo-valve plunger 32 and the valve housing, thereby creating a constant urge in one direction which serves to remove any backlash between the screw 39 and the nut 38. When the piston 20 moves it causes the screw 39 to exert an axial thrust on the nut 38 in a direction opposite to its initial movement, thereby closing the pressure port 29 of the servo-valve.

A power operated transmission is provided for effecting actuation of the servo-motor at a plurality of feed rates or at a rapid traverse rate as well as in opposite directions, and an improved control mechanism is provided for governing the transmission whereby different automatic operating cycles may be obtained.

The transmission is mounted in a gear box 45 located in the bed of the machine as shown in Figure 1 and is driven by a prime mover, such as an electric motor 46 illustrated in Figure 13. The transmission has a primary drive shaft 47 which is connected by a train of gears, indicated generally by the reference numeral 48, to the armature shaft 49 of the motor 46. The shaft 47 has a rapid traverse drive gear 50 keyed thereto which is operatively connected through the train of gears 51 and 52 to the final gear 53 of the rapid traverse branch. The shaft 47 also drives through a variable speed friction device, indicated generally by the reference numeral 54, a gear 55 at variable feed rates.

The variable speed friction device may be the same as that shown in U. S. Patent 1,950,675, and therefore further description thereof is not believed to be necessary.

Attention is invited to the fact that the gears 52 and 55 are provided with integral beveled gears 56 and 57 and these gears are continuously rotated in opposite directions because the idler 51 causes the gear 52 to rotate in the same direction as the gear 50, while the output gear 58 of the variable speed friction device is rotated in the same direction as the shaft 47 by the circumscribing ring 59 of the variable speed friction device, thus causing the gear 55 to rotate in a direction opposite to the shaft 47. A differential bevel gear 60 intermeshes with gears 56 and 57 and is rotatably supported on a cross pin 61 fixed in a bracket 62 which is integral with shaft 63. The shaft 63 serves to support the gears 56 and 57 for free rotation, but is integrally connected to a spur gear 64.

It will now be apparent that if the gears 52 and 55 are rotated at the same rate but in opposite directions that the bevel gear 60 will rotate about its axis at the same speed as gears 56 and 57 and not cause any rotation of shaft 63 and spur gear 64. If, with this condition prevailing, the rate of rotation of gear 55 is decreased as, for instance, by two revolutions per minute, the differential action will cause the gear 64 to rotate at one revolution per minute. Thus, by gradually decreasing the rate of rotation of the gear 55, as by means of the variable speed friction device, the rate of rotation of the gear 64 may be increased. By means of this combination very low feed rates may be obtained.

The gear 64 drives a gear 65 which is supported in co-axial relation with the rapid traverse gear 53 for alternate connection to output shaft 66.

This shaft has a gear 67 keyed to one end, and a second gear 68 splined to it intermediate of its length and shiftable in one direction to cause engagement of the feed clutch 69 whereby the shaft 66 will be driven by the gear 65; and in the opposite direction to effect engagement of the friction clutch 70 whereby the rapid traverse gear 53 will drive the shaft 66.

The gear 67 is operatively connected through an intermediate idler 71 to one of two reversing gears 72 supported on shaft 73. The gear 68 meshes directly with the other reversing gear 74 supported on shaft 73 whereby the gear 74 will be rotated oppositely to gear 72.

The opposing faces of gears 72 and 74 have clutch teeth 75 and 76 respectively for interengagement with clutch teeth formed on opposite ends of the shiftable reversing clutch 77. The clutch 77 is splined on the shaft 73 whereby upon engagement of the clutch with either gear 72 or 74 the shaft 73 will rotate shaft 79 and sprocket wheel 80 through a pair of bevel gears indicated generally by the reference numeral 78. This sprocket wheel is connected by a chain 81 to sprocket wheel 42.

The gear 68 constitutes a feed-rapid traverse selector, or in other words, a rate selector and is operatively connected by a cross pin 82 to a piston 83 which is slidably mounted in an axial bore 84 formed in the shaft 66. The pin 82 passes through elongated slots 85 in the shaft in order to permit sufficient lateral movement of the pin 82 to effect engagement of the clutches 69 and 70. A spring 86 is interposed between one end of the piston 83 and the end of the bore 84 to normally urge the selector 68 in a direction to cause engagement of the feed clutch 69. The other end of the bore 84 is closed and provided with a port 87 to which is connected a fluid supply channel 88. When pressure is delivered through this channel the piston 83 is moved against the compression of spring 86 to cause engagement of the rapid traverse clutch 70.

The clutch 77 constitutes a direction selector which also has a centralized stop position. The clutch is shifted by a shifter fork 89 and piston 90 into engagement with the clutch 76; by piston 91 into engagement with the gear 75; and into a central position by a pair of sleeves 92 and 93. The sleeves 92 and 93 are slidably mounted in cylinders 94 and 95 and are provided with shoulders 96 which limit the outward movement of the sleeves under pressure. The projecting ends of the sleeves are of such length that when pressure is admitted to both cylinders the sleeves will centralize the clutch 77 as the shoulders engage the ends of the cylinders. The parts are shown in this position in Figure 13. With the parts thus positioned, if pressure is admitted to only one cylinder, then one of the central pistons 90—91 will shift the fork 89 and simultaneously cause retraction of the opposing piston and surrounding sleeve. Thus, the clutch 77 may be shifted to any one of three positions.

Means have been provided for manual actuation of the shaft 73, when the reversing clutch is in a neutral position, comprising a hand wheel 96 supported for free rotation on the shaft 73. A shiftable clutch member 97 is splined on the shaft 73 for operatively connecting the hand wheel 96 to the shaft 73. The clutch 97 is shifted by a shifter fork 98 that is normally held in a disengaged position by a spring 99. A fluid operable piston 100, slidably mounted in a cylinder 101, is adapted to be hydraulically actuated for shifting the clutch into engagement with the hand wheel.

The reversing cylinders 94 and 95 are operatively connected by channels 102 and 103 to ports 104 and 105 of a rate and direction control valve, indicated generally by the reference numeral 106. This valve has a housing 107 in which the ports 104 and 105 are formed. The valve also has a port 108 which is connected by channel 109 to the pressure supply port 110 of a rapid traverse pump control valve 111. The valve also has a port 112 to which the feed supply pump 113 is connected by channel 114. The feed pump has an intake 115 through which fluid is withdrawn from a reservoir 116.

An annular groove 117 formed in the periphery of a sleeve 118 serves to continuously interconnect port 112 with port 110 whereby the delivery from the feed pump flows continuously through the valve 111. Thus, the port 108 of the control valve 106 is continuously supplied with fluid.

The control valve 106 has a rotatable sleeve 119 which is fixed against axial movement. The sleeve has an annular groove 120 formed in its periphery which interconnects the pressure port 108 with an interdrilled passage 121 formed in the housing 107, Figures 7 and 13, and this passage has an outlet 122 which is in constant communication with an annular groove 123 formed in the periphery of the sleeve 119. As shown in Figure 6, the groove 123 has a series of longitudinally extending grooves 124 which are of sufficient length to overlap in a cross sectional plane as shown in Figure 12 with the ends of a second series of longitudinal grooves 125 which intercommunicate with an annular groove 126. The ports 104 and 105 lie in this cross sectional plane and the parts are so related that in one rotatable position of the sleeve the port 105 is connected by groove 124 to pressure groove 123, while the port 104 is connected by groove 125 to the exhaust groove 126.

When the sleeve is rotated through an angle represented by the space between a groove 124 and a groove 125, the hydraulic connections to cylinders 94 and 95 are reversed. The sleeve is hydraulically oscillated from one position to the other by a pair of pistons 127 and 128, Figure 10, which are located on opposite sides of a lever 129 having a pivot 130 at one end and a connection 131 at the other end to the sleeve.

Pistons 127 and 128 are slidably mounted in cylinders 132 and 133. The cylinder 132 is connected by a channel 134 to port 135 of a pilot valve 136. The cylinder 133 is connected by a channel 137 to port 138 of a second pilot valve 139. The pilot valves 136 and 139 have pressure ports 140 and 141 respectively which are operatively connected by branch channels 142 and 143 to the pump supply line 109. The pilot valves 136 and 139 have valve plungers which are of the push button type in the sense that the plungers are adapted to be depressed by trip dogs carried by the movable support such as the table but as soon as the dog has passed out of engagement with the plunger the same is returned to its normal position by a spring. These valves have plungers 145 which are of the same construction and each has an annular groove 146 for interconnecting the pressure port with the cylinder port, upon depression of the plunger, to cause rotation of the sleeve in opposite directions.

Each plunger also has a shoulder 147 which limits its outward movement by the spring 148 which is interposed between the end of the plunger and the end of the housing. The operating ends of these plungers are cut away to form dog contacting surfaces 149 and 150. These portions are illustrated in Figures 3 and 4 and are adapted to be actuated by reversing dogs, one of which is illustrated at 151.

After the control valve sleeve has been shifted it is desirable that the pressure in the actuating channel, such as 134 or 137, be reduced so that a subsequent actuation in the opposite direction can be effected. Since no reservoir connection is provided for in the valving, the channels 134 and 137 have been provided with bleeder coils 152 and 153 whereby after the trip plungers 145 have been spring returned to their normal position, the actuating fluid will immediately bleed sufficiently to cause the pressure to drop to atmospheric pressure and thus facilitate the next shifting movement.

The control valve has a central plunger 154 which is axially movable in the bore of the sleeve 119 and this plunger has three positions, a top position, in which it is shown in Figures 7 and 13, being the "stop" position; an intermediate or feed position; and a lower or rapid traverse position. The plunger has a wide annular groove 155 in which is drilled a cross bore 156 to effect communication with an axial bore 157 which is open at the lower end to form a reservoir connection.

The plunger has a second annular groove 158 which in the stop position establishes communication through radial holes 159 in the bottom of groove 120 between the pressure port 108 and the annular groove 125. Since the groove 123 is a continuous pressure groove, and the groove 126 being also connected to pressure at this time, both channels 102 and 103 are under pressure, thereby actuating sleeves 92 and 93 to position the reversing clutch in its stop position.

The plunger 154 is manually shifted by a lever 160 which is rotatably supported by a pin 161 on a pair of ears 162 integral with a cap member 163. The cap is secured to the upper end of the sleeve 119 by fillister headed screws 164. The sleeve is provided with an annular rib 165 to form a pair of shoulders, the lower shoulder resting on the housing 107 and the upper shoulder being engaged by a clamping plate 166 which is secured to the housing by screws 167, which thus holds the sleeve against axial movement while permitting rotation thereof. It will thus be seen that rotation of the handle 160 will rotate the sleeve while movement of the handle about the axis of pin 161 will effect axial movement of the plunger 154 through a cross pin 160' carried by the lever 160 and engaging a slot 161' in plunger 154. A detent mechanism is provided for holding the plunger in either one of three positions and comprises a detent plate 168 which is secured to the pin 161 by a set screw 169. A detent plunger 170 is pivoted to the lever 160 on a pin 171, and a spring 172 serves to maintain the detent lever into engagement with the periphery of the detent plate. The plate is provided with three V-notches 173, 174 and 175 which correspond to the three positions of the plunger 154.

When the plunger 154 moves downward to its intermediate position, at which time the detent lever 170 will engage notch 174, the annular groove 155 will establish communication between the groove 126 in the sleeve and the exhaust port 156 in the plunger. This will cause the reversing clutch to be shifted in a direction corresponding to the rotatable position of the sleeve 119. At the same time cylinder 101 which is connected to port 120 will be connected to reservoir, permitting the spring 99 to disengage the clutch 97 from the hand wheel 96.

Further downward movement of the plunger 154 to its lower or third position will cause the annular groove 158 to interconnect the pressure port 108 with port 173' to which the channel 88 is connected, thereby causing fluid pressure to actuate piston 83 and cause engagement of the rapid traverse clutch.

When the machine is stopped, the control valve plunger 154 will always be in the position shown in Figures 7 and 13 and therefore it is necessary for the operator to rotate the lever 160 about the axis of pin 161 to start the machine. After the lever has been manually shifted into a feed or rapid traverse position, subsequent movements may be automatically effected to complete an automatic cycle of operation.

For the purpose of shifting the plunger 154 from a feed position to a rapid traverse position, the plunger 154 is provided on the lower end with an enlarged spool 176 which slides in an enlarged portion 177 formed in the lower end of the sleeve, thus creating a piston differential between the opposing ends of spools 176 and 178. A pressure port 179 is provided in the sleeve to communicate with the space between the spools 178 and 176 when the plunger is in a feed position. This port is connected by a channel 180 to port 181 of a rapid traverse pilot control valve 182. The plunger 183 of this valve has an annular groove 184 which upon depression of the valve will connect pressure port 185 to port 181 to cause shifting of the control valve plunger 154 to a rapid traverse position.

Means are also provided for shifting the plunger 154 automatically from a rapid traverse position to feed position, and additional means are provided for shifting the plunger from either a rapid traverse position or a feed position to its stop position. A feed-stop trip plunger is provided for effecting each of these movements. The actuating plunger for shifting the valve 154 from a rapid traverse position to a feed position is indicated by the reference numeral 186 in Figures 6, 7 and 13 of the drawings, and it will be noted that this plunger is slidable in a bore 187 formed in the base of the valve housing 107 for engagement with the bottom of the plunger 154.

The actuating plunger 186 has an enlarged head 188 which is adapted to engage a shoulder 189 formed by the enlarged portion 190 of the bore 187. This limits the upward movement of the plunger and by making the plunger of the proper length it will position the member 154 in the proper feed position, aided, of course, by the detent mechanism.

The enlarged portion 190 of the bore 187 constitutes a cylinder which is closed at the lower end by a plug 191 and connected by channel 192 to the port 193 of a feed-stop trip valve 194. This valve has an interdrilled connection 195, Figure 9, which serves as a pressure port and which is connected by branch 196 to port 185 of the rapid traverse trip valve 182.

A branch 197 of channel 103 is utilized to supply fluid to these two valves. The feed-stop valve has a plunger 198 in which is formed an annular groove 199 which is of such width that when the plunger is depressed a predetermined amount the pressure port 195 will be connected to port 193 to cause actuation of the plunger 186.

If the plunger is depressed a greater amount the port 195 is disconnected from port 193 and connected by means of an annular groove 200 in the plunger to a port 201 whereby the fluid will flow through channel 202 to cylinder 203 for actuation of the stop plunger 204. The stop plunger is of the same construction as the feed plunger but of greater length so as to shift the control valve plunger 154 to its stop position.

Channels 192 and 202 are each provided with bleeder coils 205 and 206 whereby the fluid pressure in either of these channels may drain to reservoir after the trip plunger valve is closed.

The trip plunger valves 182 and 194 are only effective during one direction of movement of the table and therefore a second set of valves is provided and arranged to be effective during the other direction of movement of the table. The other rapid traverse valve is indicated by the reference numeral 207, and has a port 208 connected by channel 209 to channel 180, thus being connected in parallel, with port 181 of the rapid traverse valve 182, to the valve port 179. The feed-stop valve is indicated by the reference numeral 210 and has a first port 211 which is connected by channel 212 to channel 192, thus being in parallel with port 193; and a second port 213 which is connected by channel 214 to channel 202, thus being in parallel with port 201. The valve 210 has an annular groove 215 which is connected by branch 216 to port 217 of the rapid traverse valve 207.

The annular groove 215 is connected to channel 102 through which fluid flows to the reversing cylinder 94. It will now be noted that the supply to the first set of trip plungers 183 and 198 is from the line 103 and to the other pair of trip plungers from line 102.

As previously described, channels 102 and 103 are alternately supplied with pressure to determine the direction of movement of the table and therefore during actuation of the table, only one of these channels is under pressure at a given time. This means that during one direction of travel of the table only one set of plungers is supplied with pressure which means that the other set is rendered inoperative, and therefore if they are actuated by their respective trip dogs they will produce no effect. This arrangement eliminates the necessity for using latch dogs when setting up a machining cycle.

One cycle of operation of the machine will now be described, reference being had to Figures 3 and 4 which show a typical arrangement of dogs for producing the cycle diagrammatically shown in Figure 2, it being understood that many other cycles are possible, depending upon the arrangement of the trip dogs. It will be noted from Figures 3 and 4 that the operating ends 149 and 150 of the reverse control plungers lie in the same plane, both horizontally and vertically and therefore only one type of trip dog, such as 151, is provided for actuating these plungers. In the cycle shown, only one reversing dog is shown because in the cycle shown automatic reversal is only effected at one end of the table movement. The reverse control plungers are always supplied with pressure whenever the pumps are running and therefore are always effective whenever they are depressed, thereby differing from the remaining plungers which are only effective for a given direction of table movement.

In the diagram of Figure 2 the point 218 represents a stop position at which time a stop dog such as 219 would be in a position to hold the feed stop plunger 198 depressed sufficiently to effect connection of port 195 with port 201. To start the machine the operator must actuate the lever 160, but since pressure is behind the piston 204 it would be difficult to move the plunger 154 downward against this pressure. The operator, therefore, rotates the lever 160 to cause rotation of the sleeve 119, thereby disconnecting the channel 103 from pressure and connecting it to reservoir, permitting the fluid in cylinder 203 to escape to reservoir, whereby the operator may now freely move the plunger 154 downward to one of its running positions.

This would start movement of the table and the starting point is indicated by the numeral 220 on the diagram. The table would move in the direction of arrow 221 and at a rapid traverse rate which is indicated by the straight line 222. This means that the plunger 154 would be moved to its lowermost position. The manual rotation of the sleeve 119 renders the plungers 207 and 210 active and the plungers 183 and 198 inactive. As the table travels in the direction of arrow 221, a trip dog 223 engages plunger 210, causing connection of pressure port 211 with port 215 whereby fluid flows through channel 212 to cylinder 190 causing upward movement of piston 188 which positions the valve plunger 154 in a feed position.

The table then travels at a feed rate as represented by the wavy line 224 in Figure 2 until trip dog 225 depresses plunger 207. This connects pressure to channel 209, causing downward movement of valve plunger 154 to a rapid traverse position. Channel 209 has a bleeder coil 226 connected to it whereby after the dog passes out of engagement with the plunger the fluid trapped in channel 209 may drain to reservoir. The rapid traverse rate of movement is resumed by the table until the reversing dog 151 actuates plunger 149. This causes rotation of the sleeve 119 by piston 127 and this movement is limited by a stop pin 227 which rides in a slot 228 formed in the periphery of the sleeve as shown in the upper part of Figures 6 and 7. The sleeve is held in either one of two positions by a detent mechanism consisting of spring pressed balls 229 which engage opposite corners of a squared portion 230 of sleeve 119.

At the same time that the reversing dog 151 is engaging plunger 149, a feed dog 231 is in a position to depress the feed-stop plunger 198 whereby upon completion of rotation of the sleeve 119 pressure is connected to plunger 198, and since the plunger is held depressed by the dog the pressure continues through channel 192 to cylinder 190 causing the piston 186 to move the valve 154 upward to a feed position.

This feeding movement is indicated by the wavy line 232 in Figure 2 and at the end of this movement a rapid traverse dog 233 depresses plunger 183, whereby valve 154 moves down again to its rapid traverse position. The table then continues in the direction of arrow 234 until stop dog 219 depresses plunger 198. This will cause admittance of fluid to cylinder 203, returning the parts to the position shown in Figure 7.

There has thus been provided an improved transmission and control mechanism for a milling machine comprising a piston and cylinder actuator controlled by a servo-valve which, in turn, is driven by a mechanical variable speed transmission including rate and direction selectors which are remotely controlled through hydraulic power means by a control valve having parts positionable for directing fluid pressure selectively through different channels to effect the several rates and directions, there being manual and remote control means for positioning said parts, the latter means including several pilot circuits, each terminating in a control element which is actuable to admit fluid pressure to the circuit and which is located adjacent the movable support whereby trip dogs carried by the support may effect automatic actuation thereof, one set of control elements being connected for determining the direction of support movement and simultaneously effective for determining which of the remaining control elements shall have pressure fluid connected thereto so that during one direction of support movement one set of rate determining control elements will be effective and another group ineffective, thus making it possible to have two different sets of rate control elements which are respectively effective during respective directions of support movement with the result that as respects the ineffective group it becomes unnecessary to provide any means to prevent dog actuation such as providing latch dogs or for removal of control elements from the path of their respective actuating dogs which is necessary with present structures.

We claim:

1. In a milling machine having a translatable support, the combination with a transmission for reciprocating said support at variable rates, of a control mechanism for said transmission including duplicate sets of control elements operatively connected for changing the rate of said transmission, trip dogs for sole actuation of each of said control elements, said dogs being selectively positionable on said support in desired cyclic sequence, automatic means for reversing the direction of support movement, and a selector positionable in response to the different positions of said reversing means for alternately connecting power to said control elements whereby a set of control elements will be effective and a set will be ineffective for producing rate changes under dog operation during a given direction of support movement.

2. In a milling machine having a translatable support, the combination with a transmission for effecting said translation at different rates, of a control mechanism for said transmission including duplicate sets of control elements operatively connected for producing rate changes, trip dogs adapted to be cyclically arranged on said support in the path of the respective elements of one set, additional trip dogs adapted to be cyclically arranged on said support in the path of the respective elements of the other set, and a selector for connecting power to one or the other set of control elements in accordance with the direction of support whereby during a given direction of support movement one set will be effective and the other set will be ineffective.

3. In a milling machine having a translatable support, the combination with a transmission for reciprocating said support, of rate and direction control means for said transmission, including a manually operable control positionable to start the support at a rapid traverse rate, a trip operable feed control plunger, an actuating dog therefor carried by the support, automatic means for reversing said support, and power means connectible by said reversing means in one position thereof for rendering the plunger effective to produce a feed rate when dog operated during one direction of support movement, and ineffective when dog operated during the other direction of support movement.

4. In a milling machine having a translatable support and a variable speed transmission for translating said support, the combination of a control mechanism for said transmission including a manually operable control positionable to start the support at a feed rate, a rapid traverse control plunger, a trip dog carried by the support for depressing said plunger to change the rate to rapid traverse, means for automatically reversing the direction of support movement, and power means connectible by said reversing means in one position thereof for rendering said plunger effective to produce a rate change under dog operation during one direction of support movement, and ineffective during the other direction of support movement.

5. In a milling machine having a translatable support, the combination with a transmission for translating said support, of a control mechanism for said transmission including a manually operable control for starting the support at a feed rate, a stop control plunger potentially effective for disconnecting the transmission from the support, a trip dog for actuating said plunger, means for automatically reversing the direction of support movement, and means for connecting power to said plunger in response to actuation of said reversing means whereby the stop plunger will be ineffective under dog operation during advance movement of the table, but will be effective during return movement of the table.

6. In a milling machine having a transmission for a translatable support, the combination of a control mechanism for said transmission for varying the rate and direction thereof including a manually operable control positionable to start the support at a rapid traverse rate, a feed control element and a rapid traverse control element mounted adjacent said support, individual trip dogs for said elements selectively positionable on said support, trip operable means effective on said transmission for reversing the direction of support movement, and simultaneously rendering said elements effective under dog operation during one direction of support travel and ineffective during the other direction of support travel.

7. In a milling machine having a transmission for a translatable support, the combination of a control mechanism for said transmission for controlling the rate and direction of support translation including a manually operable control positionable to start the support at a rapid traverse rate, a feed control element and a stop control element mounted adjacent said support, individual trip dogs selectively positionable on said support for effecting successive actuation of said elements whereby the support after moving at a feed rate will stop, said stop control element also being effective to shift said manually operable control to a stop position, said manually operable control being movable in a second direction to preselect a new direction of support movement and simultaneously render said feed and stop control elements ineffective under dog actuation during movement of the support in the new direction.

8. In a milling machine having a transmission for a translatable support, the combination of a control mechanism for said transmission for controlling the rate and direction of support translation including a manually operable control positionable to start the support at a rapid traverse rate, a feed control element and a rapid traverse control element mounted adjacent said support, individual trip dogs for actuating said elements in the order named, whereby the support will travel successively at a rapid traverse rate, a feed rate and a rapid traverse rate, a stop control element also positioned adjacent said support, a trip dog for actuating said last-named element to stop the support and simultaneously position said manual control in a stop position, said manual control being movable in a second plane to preselect a new direction of support movement and simultaneously render all of said control elements ineffective under dog actuation during the new direction of support movement.

9. In a milling machine having a transmission for a translatable support, the combination of a control mechanism for said transmission for controlling the rate and direction of support translation including a manually operable control positionable to start the support at a rapid traverse rate, a feed control element and a trip dog therefor mounted respectively on a fixed part of the machine and on the support whereby to change said rapid traverse rate to a feed rate, means for automatically reversing the direction of support movement and rendering said feed control element ineffective during the return movement of said support, a rapid traverse control element mounted adjacent said support, a trip dog for actuating said last-named control element subsequent to actuation of said feed control element, and means controlled by said reversing means for rendering said rapid traverse control element effective under dog operation during one direction of support movement only.

10. In a milling machine having a transmission for a translatable support, the combination of a control mechanism for said transmission for controlling the rate and direction of support translation including a manually operable control positionable to start the support at a rapid traverse rate, a feed control element and a rapid traverse control element mounted adjacent said support, a series of trip dogs for the respective elements alternately positionable on said support for effecting alternate actuation of said elements whereby the support will move at spaced intervals at a feed rate and at other times at a rapid traverse rate, means for automatically reversing the direction of support movement and simultaneously rendering all of said control elements ineffective during the reverse movement, a duplicate rapid traverse control element and control dog therefor, means operable by said reversing means for rendering said duplicate rapid traverse control element effective during the return movement of the table whereby if the table reverses while in a feed rate it will return at a rapid traverse rate.

11. In a milling machine having a transmission for a translatable support including a shiftable reversing clutch for changing the direction of support movement, the combination of control means for said clutch including fluid operable shifting means, a control valve, actuating pistons for said control valve, a source of pressure, individual plungers for connecting the source of pressure to the respective pistons, said plungers normally being held in an inoperative position, channels connecting the plungers to their respective pistons, and bleeder coils connected to each channel whereby after actuation of a plunger to a fluid connecting position and release to effect actuation of a piston, the fluid in said channel may bleed to reservoir preparatory to the next movement.

12. In a milling machine having a transmission for a translatable support including an output shaft, a shiftable reversing clutch for connecting said shaft to the transmission for effecting opposite movement of the support, of fluid actuating and control means for said clutch including a pair of channels, a control valve, a source of pressure connected to said valve, said valve having an exhaust port, a first part movable for reversely connecting said channels to said source of pressure and to said exhaust port to effect opposite shifting of the reversing clutch, a second valve part movable independently of said first part to connect said exhaust port to a source of pressure whereby both channels will be under pressure, means responsive to pressure in both of said channels for shifting said reversing clutch to a neutral position, a hand wheel for manual actuation of the output shaft, and means simultaneously responsive when pressure is connected to both channels to effect operative engagement of the hand wheel with said shaft.

13. In a milling machine having a transmission for a translatable support including a shiftable reversing clutch for connecting the transmission for opposite movement of the support, of fluid actuating and control means for said clutch including a pair of channels, a control valve, a source of pressure connected to said valve, said valve having an exhaust port, a part movable for reversely connecting said channels to said source of pressure and to said exhaust port to effect opposite shifting of the reversing clutch, and a plunger in said valve movable independently of said part to connect said exhaust port to a source of pressure whereby both channels will be under pressure, means responsive to pressure in both of said channels for shifting said reversing clutch to a neutral position, and manual and fluid operable means for shifting said plunger to effect neutralization of said clutch.

14. In a milling machine having a transmission for a translatable support, said transmission having a clutch shiftable for changing the rate of support movement, the combination of control means for shifting said clutch including a control valve, means normally maintaining said clutch in a feed position, fluid operable means for shifting the clutch to a rapid traverse position, manually operable means for positioning said valve in a feed position, thereby connecting said fluid operable means to reservoir, a push button valve normally held in a closed position, fluid operable means for shifting said control valve to a rapid traverse position, a channel connecting said last-named means to said push button valve, a source of pressure, means carried by the support for actuating said push button valve to connect said source of pressure to said channel to effect shifting of said control valve to a rapid traverse position, and means connected to said channel for exhausting the fluid after the push button valve closes.

15. In a milling machine having a transmission for a translatable support including a shiftable rate changing clutch, the combination of control means for said clutch including means normally maintaining the clutch in a feed position, fluid operable means for shifting the clutch to a rapid traverse position, a source of pressure, a control valve having a feed position for connecting said fluid operable means to reservoir, and a rapid traverse position for connecting said fluid operable means to the source of pressure, and other fluid operable means for shifting the valve from either of said positions to the other.

16. In a milling machine having a transmission for a translatable support, said transmission including a feed-rapid traverse clutch, the combination of control means for said clutch including fluid operable means for shifting the clutch to its rapid traverse position, resiliently operable means for shifting the clutch to a feed position, a source of pressure, a control valve alternately positionable to connect said fluid operable means to reservoir or pressure, other fluid operable means for shifting said control valve from either of its positions to the other, trip operable valves for connecting pressure to said other fluid operable means, and trip dogs carried by the support for independent actuation of said trip operable valves.

17. In a milling machine having a transmission for a translatable support, said transmission including a feed-rapid traverse clutch, the combination of control means for said clutch including fluid operable means for shifting the clutch to a rapid traverse position, means continuously effective for shifting the clutch to a feed position when pressure is released from said fluid operable means, a source of pressure, a control valve having a rapid traverse position in which said source of pressure is connected to said fluid operable means, and a feed position in which said fluid operable means is connected to reservoir, said valve having a third position, manually operable means for shifting the valve from its third position to either of said other named positions, and fluid operable means automatically controlled by the support for shifting said control valve from its feed position to its rapid traverse position or from its rapid traverse position to its feed position to change the rate of movement of the support.

18. In a milling machine having a transmission for a translatable support including a feed-rapid traverse clutch, the combination of control means for said clutch including a fluid operable valve having a first position for causing said clutch to be shifted to a feed position, and a second position for causing said clutch to be shifted to a rapid traverse position, a first channel terminating in fluid operable means for shifting said control valve to a feed position, a second channel terminating in fluid operable means for shifting said control valve to a rapid traverse position, control elements individual to said channels and trip operable by the support for connecting fluid pressure to said channels, and means in each of said channels for exhausting fluid therefrom after said trip operable elements have closed.

19. In a milling machine having a translatable support, the combination with a transmission for reciprocating said support at variable rates, of duplicate sets of control elements operatively connected for producing rate changes, suitable trip dogs adapted to be selectively positioned on said support in desired cyclic sequence for effecting sole actuation of the respective control elements, trip operable reversing means, and a selector operable by said reversing means for alternately rendering said sets of control elements ineffective under dog operation during the respective directions of support movement.

20. In a milling machine having a translatable support and a transmission for shifting said support at different rates, the combination of duplicate sets of control elements operatively connected for producing said different rates, trip dogs adapted to be arranged on said support in the path of the respective elements of one set, additional trip dogs adapted to be arranged on said support in the path of the elements of the other set, and a selector for connecting power to one set of control elements at a time.

21. In a milling machine having a translatable support, a transmission therefor including a shiftable feed-rapid traverse selector and a shiftable reverser, the combination of control means including four trip operable plungers having operating portions lying in respectively different horizontal planes, trip dogs carried by the slide and operating in each of said planes, a rapid traverse effecting piston and a feed effecting piston means connecting two of said plungers in parallel to one of said pistons, means connecting the remaining two of said plungers in parallel to the other of said pistons, means responsive to the direction of table movement for connecting operating pressure to one of each of said parallel connected plungers whereby a feed control plunger and a rapid traverse control plunger are effective under dog operation for one direction of table movement and the remaining plungers are effective during the other direction of table movement.

22. In a milling machine having a translatable support and a transmission mechanism therefor including rate and direction selectors, said direction selector having a pair of direction determining positions and a stop position and said rate selector having a feed and a rapid traverse position, the combination of fluid operable means for shifting the direction selector to its direction determining positions, additional fluid operable means for shifting the direction selector to its stop position, fluid operable means for shifting the rate selector to its rapid traverse position, control valve means having a plurality of positions for selectively connecting fluid to the several fluid operable means, pilot circuits for remote control positioning of said valve means including a pair of pistons for determining direction, a piston for producing a feed rate, a piston for producing a rapid traverse rate and a piston for shifting said control valve means to a stop position, pairs of parallel connected trip operable plungers for controlling each of the last three-named pistons, a pair of trip operable plungers individually connected to the first pair of pistons, and means controlled by the last-named plungers for determining which of each pair of said parallel connected plungers shall be connected to pressure.

23. In a milling machine having a translatable support and a transmission for actuating said support including rate and direction determinators, the combination of a fluid control circuit for said determinators including a control valve, a pilot circuit including fluid shiftable parts for positioning said control valve, an individual control plunger channel-connected to each shiftable part, means connecting a source of pressure to said plungers whereby depression of a given plunger will produce a shifting pressure in said channel, and means effective after the plunger is released to exhaust fluid from the channel to permit return movement of the fluid shiftable part.

24. In a machine tool having relatively movable tool and work supports, the combination of a transmission mechanism for effecting said relative movement including a final output shaft, fluid operable control means for changing the rate of said shaft, a remotely located control valve, a trip bracket located adjacent the moving support, a pair of valve plungers mounted in said bracket, channel means connecting said plungers for actuation of said control valve, and trip dogs carried by the moving support for depressing said plungers for remotely controlling the position of said control valve.

25. In a milling machine having a transmission including rate and direction selectors, the combination of control means therefor including a plurality of fluid operable means for shifting the several selectors into various positions, a remote control valve for said fluid operable means including a first part for controlling the admission of fluid pressure to the fluid operable means for the direction selector, and a second part for controlling the admission of fluid pressure to the fluid operable means of the rate selector, said last-named part also being effective to effect shifting of the direction selector to a stop position regardless of the position of the first-named part.

26. In a milling machine having a transmission including rate and direction selectors, the combination of control means therefor including a plurality of fluid operable means for shifting the several selectors into various positions, a remote control valve for said fluid operable means including a first part for controlling the admission of fluid pressure to the fluid operable means for the direction selector, and a second part for controlling the admission of fluid pressure to the fluid operable means of the rate selector, said last-named part also being effective to effect shifting of the direction selector to a stop position regardless of the position of the first-named part, and fluid operable control means including trip operable elements for remotely controlling the position of the parts of said control valve.

ERWIN G. ROEHM.
HANS FRITSCHI.